United States Patent
Nord et al.

(10) Patent No.: US 11,013,055 B2
(45) Date of Patent: May 18, 2021

(54) DISCONTINUOUS RECEPTION

(71) Applicant: Sony Mobile Communications Inc., Tokyo (JP)

(72) Inventors: Lars Nord, Lund (SE); Rickard Ljung, Helsingborg (SE); Svante Alnas, Lund (SE); Linh Trang, Aakarp (SE); Anders Berggren, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/334,006

(22) PCT Filed: Oct. 6, 2017

(86) PCT No.: PCT/EP2017/075445
§ 371 (c)(1),
(2) Date: Mar. 16, 2019

(87) PCT Pub. No.: WO2018/065565
PCT Pub. Date: Apr. 12, 2018

(65) Prior Publication Data
US 2019/0297663 A1    Sep. 26, 2019

(30) Foreign Application Priority Data

Oct. 7, 2016 (EP) .................... 16192881

(51) Int. Cl.
| H04W 76/28 | (2018.01) |
| H04W 52/02 | (2009.01) |
| H04W 72/12 | (2009.01) |
| H04W 76/27 | (2018.01) |

(52) U.S. Cl.
CPC ....... *H04W 76/28* (2018.02); *H04W 52/0216* (2013.01); *H04W 72/1268* (2013.01); *H04W 76/27* (2018.02); *Y02D 30/70* (2020.08)

(58) Field of Classification Search
None
See application file for complete search history.

(56) References Cited

U.S. PATENT DOCUMENTS

| 2013/0315122 A1* | 11/2013 | Sirotkin ................. H04W 4/70 370/311 |
| 2014/0036748 A1 | 2/2014 | Mukherjee et al. |
| 2014/0295820 A1 | 10/2014 | Kim |

(Continued)

FOREIGN PATENT DOCUMENTS

| EP | 2670202 A | 12/2013 |
| JP | 2013085299 A | 5/2013 |

(Continued)

OTHER PUBLICATIONS

International Search Report and Written Opinion from counterpart International Patent Application No. PCT/EP2017/075445 dated Jan. 4, 2018; 8 pages.

(Continued)

*Primary Examiner* — Diane L Lo
(74) *Attorney, Agent, or Firm* — Tucker Ellis LLP

(57) ABSTRACT

An interface of a terminal switches between at least one active state (283) and a sleep state (281) according to a schedule (200). Uplink control data is transmitted which is indicative of a temporary prolongation (209) of the at least one active state (283).

19 Claims, 12 Drawing Sheets

6001

Control interface to switch between
at least one active state and a sleep state
according to a schedule

6002

Transmit UL control data indicative of temporary
prolongation of the at least one active state

(56) References Cited

U.S. PATENT DOCUMENTS

| | | |
|---|---|---|
| 2015/0085712 A1 | 3/2015 | Wang |
| 2016/0192278 A1 | 6/2016 | Ji et al. |
| 2017/0273136 A1* | 9/2017 | Siomina ............ H04W 52/0216 |
| 2018/0124864 A1* | 5/2018 | Lee ....................... H04W 76/28 |

FOREIGN PATENT DOCUMENTS

| | | |
|---|---|---|
| KR | 1020160013851 A | 2/2016 |
| WO | 2016140273 A1 | 9/2016 |

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 13); 3GPP TS 36.321 V13.0.0 (Dec. 2015); 4 pages.

3rd Generation Partnership Project; Technical Specification Group Radio Access Network; Evolved Universal Terrestrial Radio Access (E-UTRA); User Equipment (UE) procedures in idle mode (Release 13); 3GPP TS 36.304 v13.0.0. (Dec. 2015), section 7.1, 42 pages.

\* cited by examiner

DISCONTINUOUS RECEPTION

TECHNICAL FIELD

The invention generally relates to switching between at least one active state and a sleep state of an interface of a terminal connectable to a network. The invention specifically relates to transmitting uplink control data which is indicative of a temporary prolongation of the at least one active state.

BACKGROUND

In order to reduce power consumption of terminals that are connectable to a network, so-called Discontinuous Reception (DRX) is known. For example, according to Third Generation Partnership Project (3GPP) Long Term Evolution (LTE) protocols, DRX can be implemented as described in 3GPP Technical Specification (TS) 36.321 (Release 13.0.0), section 5.7 for Radio Resource Control (RRC) connected mode and in 3GPP TS 36.304, section 7.1 for RRC idle mode.

According to 3GPP LTE DRX for connected mode (connected DRX), the terminal is ready to receive downlink (DL) payload data during an ON time of the DRX cycle. An RRC connection is established at the beginning of the ON time and released at the end of the ON time. According to 3GPP LTE DRX for idle mode (idle DRX), the terminal is ready to receive network paging during the ON time of the DRX cycle. An RRC connection is not established during the ON time, but only established on demand if the terminal is in fact paged by the network. Both, in RRC connected and RRC idle, the UE may be registered with the network.

However, such techniques face certain restrictions and drawbacks. For example, it has been observed that implementing a comparably static DRX cycle can cause increased latency. Sometimes, DL payload data may not be delivered in time to the terminal before the expiry of the ON time of the DRX cycle. Then, a comparably long time may lapse before the ON time of the next repetition of the DRX cycle opens a new window of opportunity for delivering the DL payload data. In particular, such reference implementations impose certain constraints with respect to the dimensioning of the cycle length of the DRX cycle. For example, the cycle length of the DRX cycle is increased in an attempt to further reduce power consumption of terminals, the latency may further increase.

SUMMARY

Therefore, a need exists for advanced techniques of switching between at least one active state and an sleep state according to a schedule. In particular, a need exists for such techniques which overcome or mitigate at least some of the above-identified restrictions and drawbacks.

This need is met by the features of the independent claims. The dependent claims define embodiments.

According to an example, a terminal includes an interface. The interface is configured to communicate with the network on a wireless link. The terminal further includes at least one processor. The at least one processor is configured to control the interface to switch between at least one active state and a sleep state according to a schedule. The at least one processor is further configured to transmit uplink (UL) control data to the network. The UL control data is indicative of a temporary prolongation of the at least one active state.

According to an example, a method includes controlling an interface of a terminal to switch between at least one active state and a sleep state according to a schedule. The method further includes transmitting UL control data to a network. The UL control data is indicative of a temporary prolongation of the at least one active state.

According to an example, a computer program product includes program code that may be executed by at least one processor. Executing the program code causes the at least one processor to perform a method. The method includes controlling an interface of a terminal to switch between at least one active state and a sleep state according to a schedule. The method further includes transmitting UL control data to a network. The UL control data is indicative of a temporary prolongation of the at least one active state.

According to an example, a computer program includes program code that may be executed by at least one processor. Executing the program code causes the at least one processor to perform a method. The method includes controlling an interface of a terminal to switch between at least one active state and a sleep state according to a schedule. The method further includes transmitting UL control data to a network. The UL control data is indicative of a temporary prolongation of the at least one active state.

According to an example, a network node of a network includes at least one processor. The at least one processor is configured to receive UL control data from the terminal. The UL control data is indicative of a temporary prolongation of at least one active state of a schedule. The schedule is for switching an interface of the terminal between the at least one active state and a sleep state. For example, the network node may be a base station.

According to an example, a method includes receiving UL control data from the terminal. The UL control data is indicative of a temporary prolongation of at least one active state of a schedule. The schedule is for switching an interface of the terminal between at least one active state and a sleep state.

According to an example, a computer program product includes program code that may be executed by at least one processor. Executing the program code causes the at least one processor to perform a method. The method includes receiving UL control data from the terminal. The UL control data is indicative of a temporary prolongation of at least one active state of a schedule. The schedule is for switching an interface of the terminal between at least one active state and a sleep state.

According to an example, a computer program product includes program code that may be executed by at least one processor. Executing the program code causes the at least one processor to perform a method. The method includes receiving UL control data from the terminal. The UL control data is indicative of a temporary prolongation of at least one active state of a schedule. The schedule is for switching an interface of the terminal between at least one active state and a sleep state.

According to an example, a system includes a base station having at least one processor. The system further includes a terminal having an interface configured to communicate with a network node such as a base station. The terminal further has at least one processor. The at least one processor of the terminal is configured to control the interface of the terminal to switch between at least one active state and a sleep state according to a schedule. The terminal and the network node are further configured to communicate UL control data indicative of a temporary prolongation of the at least one active state.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

DETAILED DESCRIPTION OF EMBODIMENTS

Figure 1:
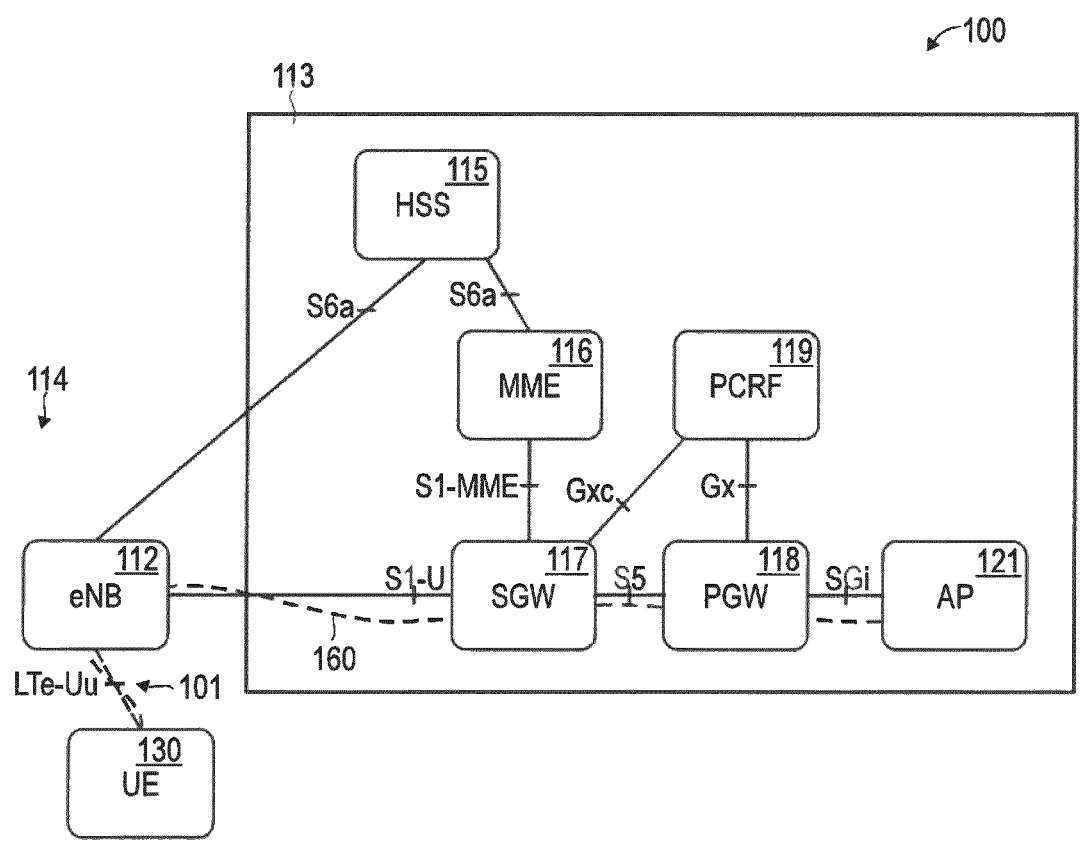
FIG. 1 schematically illustrates a cellular network including a base station according to various examples, were in FIG. 1 further illustrates the terminal connectable to the network.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of switching between at least one active state and a sleep state of an interface of a terminal are described. Sometimes, such techniques of switching between at least one active state and an sleep state are referred to as DRX. By only activating an active state of the interface every once in a while, power consumption of the terminal can be reduced.

The switching may be implemented according to a schedule. For example, the schedule may be negotiated between the terminal and the network. Such negotiation of the schedule may involve UL control signaling and/or DL control signaling. Sometimes, the negotiation may take place as part of an attach procedure for establishing a data connection on a wireless link between the terminal and the network. In other examples, it would also be possible that the schedule is predefined, e.g., according to a fixed standard, etc.

The schedule may be repetitive, i.e., may define repetitions of switching between the different states. For example, the schedule may be repetitive in time domain: In some examples, it is possible that the repetitive schedule implements a periodicity for subsequent repetitions. It is also possible that the repetitive schedule is not strictly periodic, but shows a certain variation from repetition to repetition. The repetitions of the schedule are not required to be defined in time domain; it would also be possible that the repetitions are defined in event domain: For example, different repetitions of the schedule may be event-triggered. An example of an event is the need for transmitting UL data. A further example of an event is user activity or mobility of the terminal. In some examples, the repetitions may be defined in time domain and event domain.

The schedule may indicate a timing for switching between the at least one active state and the sleep state. This may facilitate DL data transmission to the terminal, because the network then may be aware of times when the terminal is reachable.

For example, the schedule e.g., for each repetition may include a certain ON time during which one or more active states of the interface are activated. It may be possible to switch between different ones of the one or more active states during the ON time. Further, each repetition may include an OFF time during which a sleep state of the interface is activated.

The interface may be fully or largely powered down when operating in the sleep state. Sometimes, the sleep state is also referred to as dormant state or power safe state. For example, an analog front end of the interface may be disabled during the sleep state. This may include powering down one or more of the following: an analog amplifier; an analog-to-digital converter. For example, a supply voltage may not be provided to the analog amplifier and/or the analog-to-digital converter during the sleep state. Generally, during the sleep state the interface may be unfit for receiving DL data on the wireless link. The terminal may not send position updates in the sleep state. Thus, generally, in the sleep state it may not be possible to send any DL data to the terminal. It is possible that during the sleep state the terminal remains registered in a respective repository of the network. All this enables a low power consumption of the terminal in the sleep state.

Various active states are conceivable. Examples include a connected state. In the connected state, and ongoing data connection between the terminal and the network may be maintained. For example, the data connection may be implemented on the Network layer of the Open Systems Interconnection (OSI) model according to the International Standardization Organization (ISO) ITU-T X.200 (July 1994) document. For example, the data connection may include a bearer for identifying data on an UL payload channel and/or a DL payload channel. The terminal may transmit frequent position updates to the network in the connected state. For example, the serving cell at which the terminal presently camps may be known at any given moment in time to the network. In the connected state, the interface of the terminal may be fully powered up. In the 3GPP LTE framework, an example is the RRC connected state. Typically, the connected state is associated with significant power consumption of the terminal.

A further example of an active state includes the idle state. For example, the idle state may be a mixture of the connected state and the sleep state. Because of this, sometimes, the idle state is also referred to as disconnected connected state. In the idle state, it may not be required to maintain an ongoing data connection between the terminal and the network. For example, in the idle state different to the connected state, the particular serving cell of a cellular network to which the terminal is connectable may not be known to the network. The terminal may or may not transmit infrequent position updates, e.g., when changing the tracking area, etc. For example, in the idle state it may be possible for the network to page the terminal, i.e., to send a DL paging to the terminal. However, it may not be possible to directly send DL payload data. The DL paging may trigger the terminal to transition into the connected state. This may involve performing an attach procedure for establishing the payload channels of the wireless link. For example, in the idle state, the analog front end of the interface of the terminal may not be fully powered down, but generally functional. However, certain functions in the digital front end may be disabled which may include limited demodulation/decoding functionality, etc. An example of the idle state in the 3GPP LTE framework is the RRC idle state. An example of the idle state is the RRC connected inactive state being discussed in 3GPP for R14.

For example, the schedule may implement one or more active states in combination with the sleep state.

According to various examples, techniques are provided to temporarily deviate from the schedule. In other words, techniques are provided according to various examples which enable to implement temporary exceptions from the schedule. For example, such temporary deviations from the schedule may include increasing or decreasing the ON time of one or more repetitions. For example, such temporary deviations from the schedule may include increasing or decreasing the OFF time of one or more repetitions of the schedule. For example, such temporary deviations from the schedule may include increasing or decreasing a duration of a repetition of one or more repetitions of the schedule. Thus, various possibilities exist for configuring the temporary deviations. For example, such temporary prolongation may correspond to the prolongation of at least one active state defining the ON time. Thereby, it is possible to dynamically tailor the schedule according to the temporary requirements of the terminal and/or the network.

According to various examples, the terminal may trigger such a deviation from the schedule. Then, the terminal may transmit uplink control data to the network which is indicative of the temporary deviation from the schedule envisioned by the terminal. Thereby, the network may be informed accordingly to make use of any additional window of opportunity for transmitting DL data or to avoid any DL transmission attempt which is deemed to fail due to the temporary deviation.

For example, it may be possible that the temporary deviation is implemented as a prolongation of the ON time, i.e., as a prolongation of the at least one active state. This may open an additional window of opportunity for receiving DL data such as DL payload data.

One could consider a scenario where a service executed by the terminal is expecting DL payload data. This DL payload data may be network-initiated/terminal-terminating traffic.

For example, the DL payload data may be triggered by transmission of UL payload data of the service. Due to the round-trip latency associated with the service e.g., a latency defined for communication from the terminal via the network to the server hosting the service and back via the network to the terminal, the DL payload data may arrive at the terminal after expiry of the ON time. Then, the service executed by the terminal will not receive the DL payload data, because the interface already has entered the sleep state and is not reachable by the network at that time. If the time duration until next ON time is large this may impose difficulties for the device communication with the server. Such a scenario may occur when the terminal is transmitting UL payload data to an Internet server where the Internet server provides a response to the terminal with a delay longer than the ON time. Other examples in which such a scenario may occur include the terminal polling the server hosting the service for update of certain configuration settings. Still further examples in which a scenario may occur include the terminal polling the server hosting the service for a firmware update.

Based on the techniques described herein, it may be possible to anticipate such a scenario where the DL payload data or arrives after expiry of the ON time and during the OFF time, i.e., at a point in time at which the interface already switched back to the sleep state. Then, according to various examples described herein, it may be possible that the terminal transmits UL control data to the network, the UL control data being indicative of the temporary deviation from the schedule. For example, if the at least one active state is prolonged, a window of opportunity may be open for receiving the expected DL payload data.

FIG. 1 illustrates aspects with respect to the network 100. FIG. 1 illustrates aspects with respect to the architecture of the network 100. The network 100 according to the example of FIG. 1 implements the 3GPP LTE architecture. According to 3GPP LTE, a wireless link 101 is defined in a RAN 114. The wireless link 101 is defined between a base station in the form of an evolved node B (eNB) 112 and one or more UEs 130. The wireless link 101 may implement one or more channels such as payload channels and/or control channels.

Furthermore, the network 100 includes a core network 113. The core network 113 is in communication with the RAN 114. The core network 113 includes a control layer and a data layer. The control layer includes control nodes such as the home subscriber server (HSS) 115, the mobile management entity (MME) 116, and the policy and charging rules function (PCRF) 119. The data layer includes gateway nodes such as the serving gateway (SGW) 117 and the packet data network gateway (PGW) 118.

A data connection 160 is established between the UE 130-1 via the RAN 114 and the data layer of the core network 113 and towards an access point 121. For example, a connection with the Internet or another packet data network can be established via the access point 121. A server of the packet data network or the Internet may host a service for which payload data is communicated via the data connection 160. The data connection 160 may include one or more bearers such as a dedicated bearer or a default bearer. The data connection 160 may be defined on the RRC layer. Establishing of the data connection 160 may thus include OSI Network layer control signaling. By means of the data connection 160, resources may be allocated on payload channels such as the Physical Uplink Shared Channel (PUSCH) and/or the Physical Downlink Shared Channel (PDSCH).

The general functioning and purpose of the network nodes 115-119, 121 of the core network 113 is well known in the art such that a detailed description is not required in this context.

The illustration of the network 100 in the 3GPP LTE framework is for exemplary purposes only. Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA). For example, the techniques described herein may be applied to the 3GPP eNB-IoT or MTC systems or 3GPP New Radio (NR) systems. See, for example, 3GPP RP-161321 and RP-161324. Furthermore, respective techniques may be readily applied to various kinds of non-3GPP-specified networks, such as Bluetooth, satellite networks, IEEE 802.11x Wi-Fi technology, etc.

Figure 2:
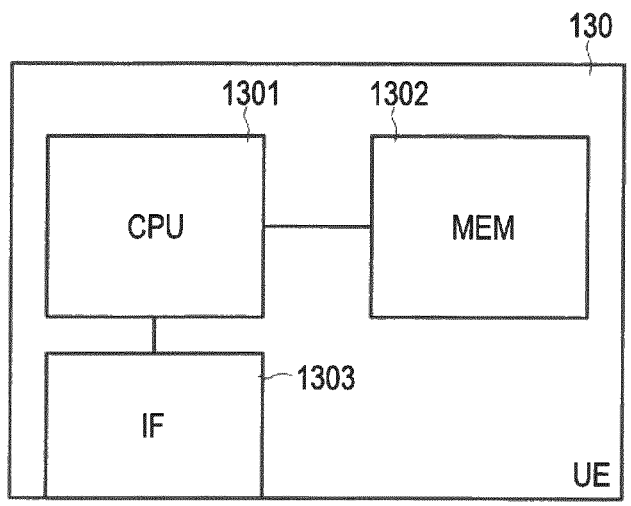
FIG. 2 schematically illustrates the terminal according to various examples.

FIG. 2 illustrates aspects with respect to the terminal 130. The terminal 130 includes a processor 1301, e.g., a multi-core processor. The terminal 130 further includes a memory 1302, e.g., a non-volatile memory. The terminal 130 further includes an interface 1303.

The interface 1303 may include a digital front end and/or an analog front end. The analog front end may be connectable to one or more antennas. For example, the interface 1303 may include one or more antenna ports. For example, the analog front end may include an amplifier such as a low noise amplifier and an analog-to-digital converter for receiving modulated and encoded signals. The analog front end may include a digital-to-analog converter for transmission. For example, the digital front end when receiving data may be configured to perform tasks such as: demodulation; decoding; de-interleaving; calculation of checksums; etc. For example, the digital front end may implement lower level functionality according to the OSI model. Typically, such tasks as demodulation and decoding are also associated with considerable energy consumption.

The interface 1303 may operate according to different states of operation. These states may include one or more active states in which the interface 1303 is able to receive some or all DL data and/or signals transmitted on the wireless link 101. For example, in the active states, the amplifier and/or the analog-to-digital converter may be at least sometimes and/or at least partly provided with a supply voltage. These states may further include a sleep state in which the interface 1303 is unfit to receive DL data transmitted on the wireless link 101. Typically, the power consumption of the terminal 130 is reduced if the interface 1303 operates according to the sleep state if compared to the interface 1303 operating according to one of the at least one active states.

The memory 1302 may store control instructions that may be executed by the processor 1301. Executing the control instructions can cause the processor 1301 to perform techniques of power saving; these may include controlling the interface 1303 to switch between at least one active state and a sleep state according to a schedule.

Figure 3:
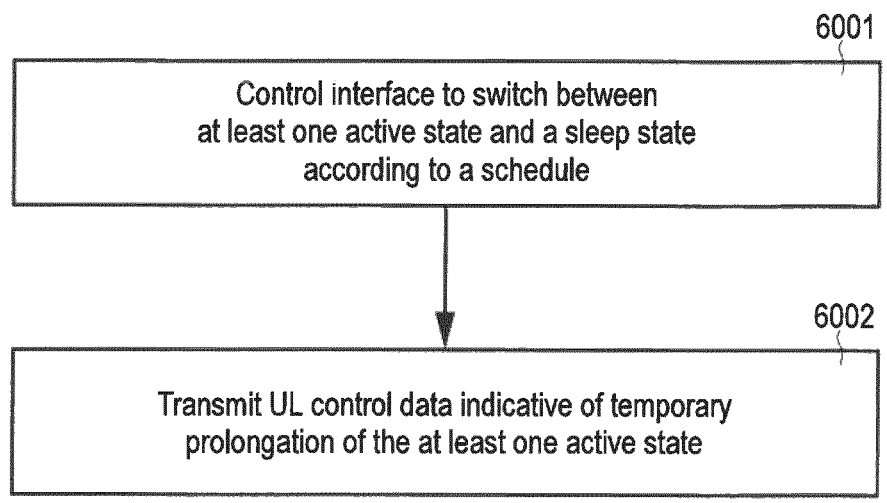
FIG. 3 is a flowchart of a method according to various examples.

FIG. 3 is a flowchart of a method according to various examples. For example, the method according to FIG. 3 may be executed by the processor 1301 of the terminal 130.

First, in block 6001, the interface of the terminal is controlled to switch between at least one active state and a sleep state. In some examples, this may occur according to schedule. Generally, the schedule may be known to the network. This may occur by negotiating the schedule. It would also be possible that the schedule is defined according to fixed rules. The schedule may be periodic. It is also possible that the schedule defines an event-triggered behavior. For example, the schedule could define the ON duration after transmission of UL payload data. Here, the event triggering the ON duration would be the need for transmitting the UL data. The schedule may be negotiated between the terminal and the network. For example, the method according to FIG. 3 may further include negotiating the schedule between the terminal and the network prior to block 6001.

Such switching according to block 6001 may implement a DRX cycle. In some examples, according to the 3GPP LTE framework, the schedule according to which switching is implemented at block 6001 may implement the connected DRX and/or the idle DRX according to the 3GPP LTE framework. However, some examples described herein may go beyond the 3GPP LTE DRX or provide alternative implementations. In some examples, the switching according to block 6001 may be event-triggered. For example, the ON duration could be activated in response to a need for transmitting UL data.

Next, in block 6002, UL control data is transmitted to the network. The UL control data is indicative of a temporary deviation from the schedule. In the example of FIG. 3, this is implemented as a temporary prolongation of the at least one active state. For example in the above example in response to the need for transmitting the UL data an extended ON duration can be indicated.

For example, the UL control data may be included in a dedicated control message, e.g., a RRC layer control message. In further examples, it is possible that the UL control data is piggybacked onto a control message serving other purposes, e.g., a control message communicated during an attach procedure for establishing a data connection or a payload channel.

The temporary deviation from the schedule may correspond to a prolongation of the ON time. Thus, the temporary deviation may correspond to a prolongation of at least one active state of the interface of the terminal. It is possible that the duration of the prolongation is also indicated by the UL control data; the duration may alternatively be network-defined.

The method may further include implementing the temporary deviation from the schedule in response to transmitting the UL control data and block 6002. Sometimes, the temporary deviation may be selectively implemented depending on an acknowledgment of the network after transmitting the UL control data.

The acknowledgment may be an explicit acknowledgment or an implicit acknowledgment. The acknowledgment may be a positive acknowledgment (PACK) or a negative acknowledgment (NACK). For example, if the network negatively acknowledges the temporary deviation from the schedule, implementation of the temporary deviation may be suppressed. For example, if the network positively acknowledges the temporary deviation from the schedule, implementation of the temporary deviation may be executed. Respective DL control data which includes the acknowledgement may, optionally, also include a duration of the deviation, e.g., a duration of a prolongation of the ON time.

Figure 4:
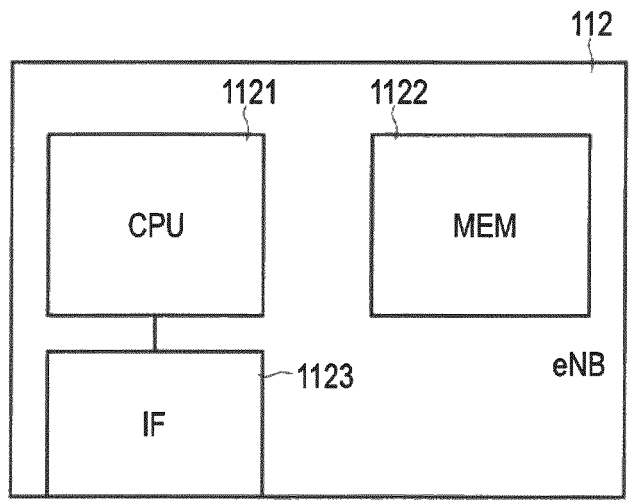
FIG. 4 schematically illustrates the base station according to various examples.

FIG. 4 illustrates aspects with respect to the eNB 112. The eNB 112 includes a processor 1121, e.g., a multi-core processor. The eNB 112 further includes a memory 1122, e.g., a non-volatile memory. The eNB 112 further includes an interface 1123. The interface 1123 may include a digital front end and/or an analog front end. The analog front end may be connectable to one or more antennas. For example, the interface 1123 may include one or more antenna ports. For example, the analog front end may include an amplifier such as a low noise amplifier and an analog-to-digital converter for receiving modulated and encoded signals on the wireless link 101.

The memory 1122 may store control instructions that may be executed by the processor 1121. Executing the control instructions can cause the processor 1121 to perform techniques of power saving at a terminal 130 connectable to the eNB 112. Such techniques may include synchronizing communication with the terminal 130 according to a schedule for switching between at least one active state and a sleep state at the terminal. The schedule may be negotiated with the terminal.

Figure 5:
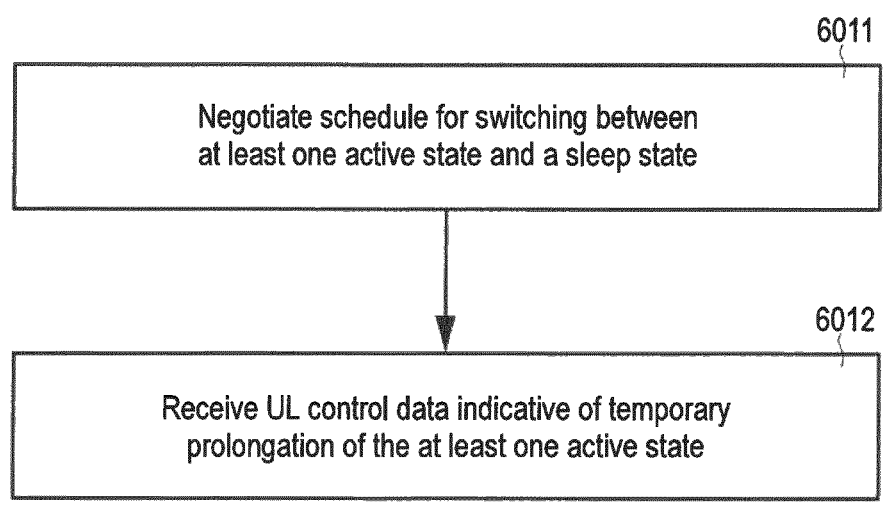
FIG. 5 is a flowchart of a method according to various examples.

FIG. 5 is a flowchart of a method according to various examples. For example, the method according to FIG. 5 may be executed by the processor 1121 to perform techniques of power saving a terminal.

First, at block 6011, a schedule for switching, at the terminal, between at least one active state and a sleep state, is negotiated. Block 6011 may include transmitting and/or receiving control data to and/or from the terminal. Block 6011 may be a one-way or a two-way negotiation. Block 6011 is optional. For example, instead of negotiating the schedule, the schedule may be fixedly predefined.

Next, at block 6012, UL control data is received from the terminal. The UL control data is indicative of a temporary deviation from the schedule. In the example of FIG. 5, the temporary deviation is again implemented as a prolongation of the at least one active state.

The method may further include implementing transmission of DL payload data and/or DL control data in accordance with the temporary deviation from the schedule.

Figure 6:
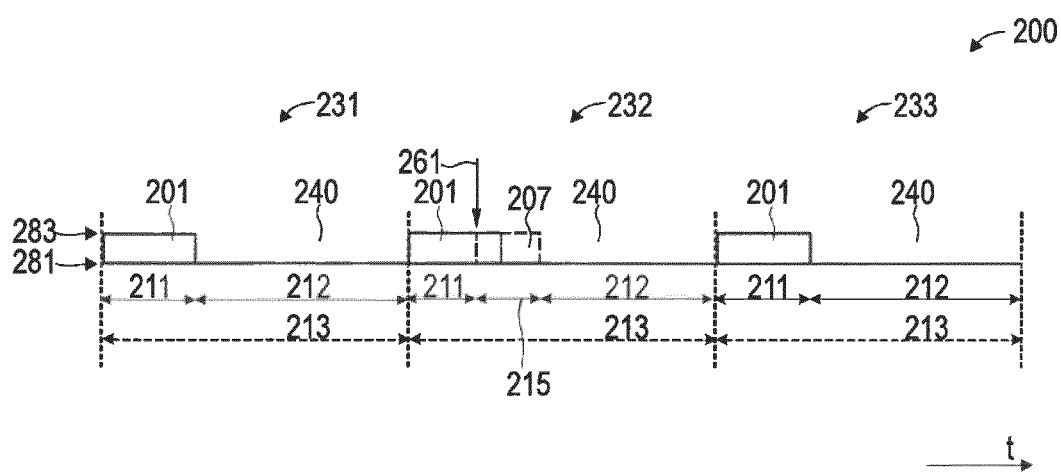
FIG. 6 schematically illustrates a repetitive schedule for switching an interface of the terminal between an active state in the sleep state according to various examples.

For example, the method of FIG. 5 may be inter-related to the method of FIG. 3. FIG. 6 schematically illustrates aspects with respect to a repetitive schedule 200. In FIG. 6, for illustrative purposes three repetitions 231-233 of the schedule 200 are illustrated. However, the schedule 200 may include a larger number of repetitions 231-233 or a smaller number of repetitions 231-233.

Each repetition 231-233, according to the example of FIG. 6, includes an ON time 201 and an OFF time 240. For example, in the repetition 231, a duration 211 of the ON time 201 is shorter than a duration 212 of the OFF time 240. The durations 211, 212 add up to the duration 213 of the entire repetition 231. While in the example of FIG. 6 a periodicity of the repetitions 231-233 is implemented, in other examples, different repetitions may have different durations.

In the ON time 201, the interface 1303 of the terminal 130 operates in a connected state 283. In the OFF time 240, the interface 1303 of the terminal 130 operates in a sleep state 281. When operating in the connected state 283 during the ON time 201, the interface 1303 is ready to receive DL data on the data connection 160. This is illustrated with respect to the repetition 232 in the example of FIG. 6: here, DL payload data 261 is transmitted by the network 100 and accordance with the schedule 200; i.e., the DL payload data 261 arrives at the terminal 130 during the ON time 201 when the interface 1303 operates in the connected state 283.

In the example of FIG. 6, reception of the DL payload data 261 triggers an inactivity timer 215. The inactivity timer 215 can also be triggered by transmission of UL payload data 261. Also, other activity during the ON time 201 can trigger the inactivity timer 215. The inactivity timer 215 implements a prolongation 207 of the ON time 201 (illustrated by the dashed line in FIG. 6). This is according to the schedule 200, because it is a predefined behavior. The prolongation 207 opens an additional window of opportunity for receiving further DL payload data while the inactivity timer 215 has not expired. The inactivity timer 215 is part of the schedule 200; as such, the network 100 is aware that due to the inactivity timer 215 another window of opportunity for transmitting DL payload data is opened.

As will be appreciated from the above, it is not required that the schedule 200 defines a fully deterministic behavior. For example, the schedule 200 may define a set of rules for switching between the different states and/or using timers and/or activating the ON time 201 and the OFF time 240. However, these rules can take into account certain variables such as the reception and/or transmission of data. Thus, depending on the circumstances, the behavior of the terminal 130 may not be fully defined a-priori.

According to various examples described herein, it may be possible to implement the temporary deviation from the schedule 200 be re-configuring a value of the inactivity timer 215, e.g., to a larger value or a smaller value if compared to the schedule-defined value. For example, in response to transmitting the UL payload data 251 the inactivity timer 215 can then be triggered. Instead of using a fixed value for the inactivity timer 215, the re-configured value can be flexibly adjusted according to the needs of the service.

Figure 7:
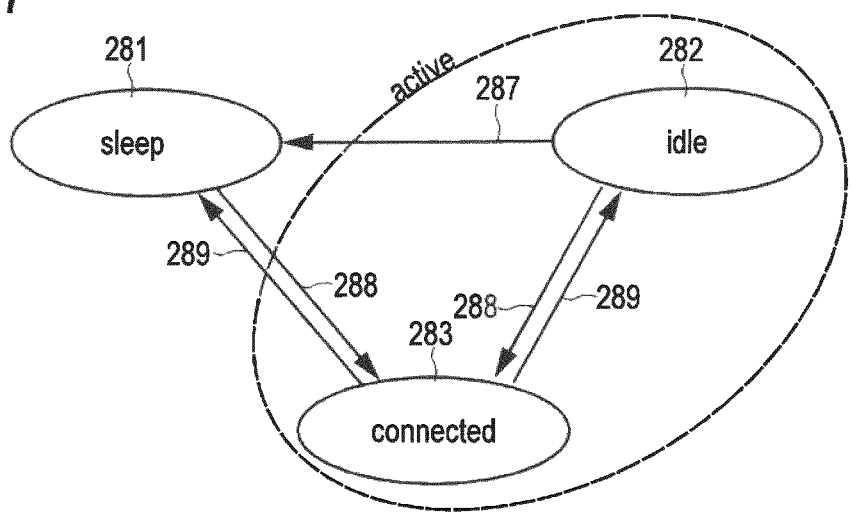
FIG. 7 is a state diagram illustrating a connected state, an idle state, and a sleep state according to various examples.

FIG. 7 schematically illustrates aspects with respect to various states 281-283 in which the interface 1303 of the terminal 130 can operate.

In the example of FIG. 7, the sleep state 281 corresponds to a dormant state of the interface 1303. Here, the terminal 130 is not fully detached from the network 100, but still registered. Position updates are not transmitted from the terminal 130 to the network 100. Thus, the network 100 is unaware of a position of the terminal 130. Furthermore, one or more components of the interface 1303 may be powered down such that the interface 1303 is not able to receive DL data. The data connection 160 may not be established. Sometimes, in 3GPP LTE the sleep state 281 is also referred to as power saving mode. See 3GPP TS 23.401 V13.0.0 (2014 September), section 4.3.22 "UE Power Saving Mode". For example, see 3GPP TS 23.682 V13.4.0 (2015 December).

In the further states 282, 283, the interface 1303 is generally ready to receive DL data, e.g., at least during certain time slots and/or on certain frequencies and/or according to certain coding/modulation. Thus, the states 282, 283 are sometimes referred to as active states (dashed line in FIG. 7).

In an RRC connected state 283, the terminal 130 maintains the data connection 160 with the network 100. See TS 36.331, chapter 4.2. This means that handovers between different serving cells of the cellular network 100 can be implemented without loss of the data connection 160. For this, the terminal 130 may transmit measurement reports on a quality of communicating on the wireless link. The network 100 is aware of the serving cell. Differently, in the RRC idle state 282, the terminal 130 may not maintain the data connection 160 with the network 100. Position updates may only be transmitted comparably infrequently or with a course accuracy, e.g., not defined on cell level. The interface 1303 may, nonetheless, be powered up at least to some degree. This may facilitate receiving of DL paging signals from the network 100. The interface 1303 may perform limited demodulation and decoding functionality. In response to receiving a DL paging, the terminal 130 may transition into the RRC connected state 283. For example, the power consumption of the interface 1303 operating in the connected state 283 may be higher by at least 30% than a power consumption of the interface operating in the idle state 282. Thus, while maintaining the terminal 130 and the active state, the power consumption can still be reduced at the cost of latency introduced by the paging necessity.

For example, the transitions 288 from sleep state 281 to RRC connected state 283 or from RRC idle state 282 to RRC connected state 283 may involve performing an attach procedure for establishing the data connection 160 including payload channels of the wireless link 101. For example, the attach procedure 288 may include a Random Access of the terminal 130 in which based on a randomly selected code and/or temporary identifications of the terminal 130 collision with further terminals seeking to access the network 100 is mitigated. Typically, the Random Access is defined on a Physical layer according to the OSI model. For example, the attach procedure 288 may alternatively or additionally include control signaling defined on a higher layer according to the OSI model. Examples include an RRC attach procedure.

The transitions 289 from RRC connected state 283 to RRC idle state 282 or from RRC connected state 283 to RRC sleep state 281 may include an RRC release procedure. In FIG. 7, furthermore, a transition 287 from the RRC idle state 282 to the RRC sleep state 281 is illustrated.

While in the example of FIG. 7, a number of two active states 282, 283 has been illustrated, in further examples, it is possible that a larger number of active states is provisioned. Some examples may include the PCH state, CELL_PCH State, URA_PCH State, CELL_FACH State, and CELL DCH State according to the 3GPP LTE TSs 25.331, section 7.1. Furthermore, while in the example of FIG. 7 the various states 281-283 have been explained with respect to the 3GPP LTE RRC layer functionality, in other examples, it is also possible to implement power-saving functionality of the interface 1303 on other layers and/or according to other protocols beyond 3GPP LTE. Nonetheless, various properties as explained above for the states 281-283 in the context of 3GPP LTE RRC layer functionality may also be applied to other examples.

Figure 8:
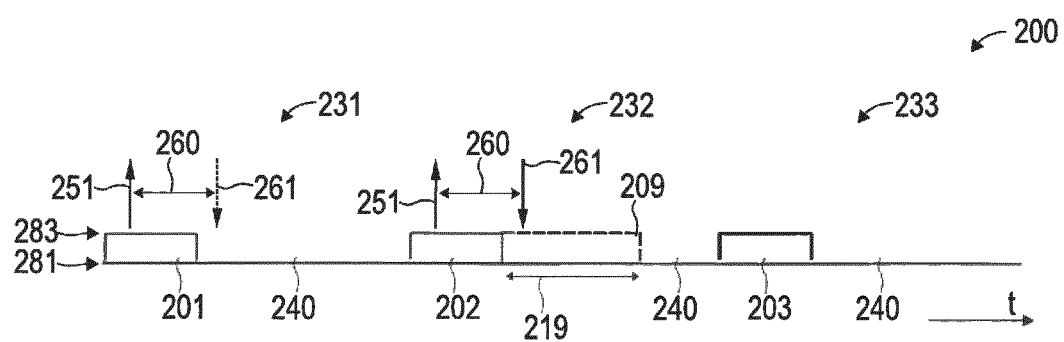
FIG. 8 schematically illustrates a repetitive schedule for switching an interface of the terminal between an active state and a sleep state according to various examples.

FIG. 8 illustrates aspects with respect to a repetitive schedule 200. In particular, FIG. 8 illustrates aspects with respect to implementing a temporary deviation from the schedule 200. The example of FIG. 8 generally corresponds to the example of FIG. 6.

In the repetition 231, the terminal 130 transmits UL payload data 251 of the service. The service is associated with a certain round-trip latency 260. The round-trip latency 260 is so long that the DL payload data 261 associated with the UL payload data 251 of the service does not arrive during the ON time 201. The DL payload data 261 arrives during the OFF time 240. In the OFF time 240 the interface 1303 operates in the sleep state 281. Therefore, the interface 1303 is unfit to receive data and, in particular, cannot receive the DL payload data 261 of the service. Then, reception of the DL payload data 261 is delayed until the next ON time (not illustrated in FIG. 8 for sake of simplicity). This increases latency of the service.

In the repetition 232, a temporary deviation from the schedule 200 is implemented. In particular, a prolongation 209 (illustrated by the dashed line in FIG. 8) is implemented. The prolongation 209 extends the ON time 202. Thus, the prolongation 209 prolongs the active state 283 in the repetition 232. This opens another window of opportunity for successfully receiving the DL payload data 261.

FIG. 8 also illustrates a duration 219 of the prolongation 209. In may be possible that the duration 219 is determined by logic residing at the terminal 130 and/or by logic residing in the network 100. In a simple example, the duration 219 may also be predefined. For example, the duration of the prolongation may be determined based on knowledge on the round-trip latency 260 of the service to which the payload data 251-261 belongs to. For example, a-priori knowledge may be derived from previous transmissions of payload data of the service. Thereby, it is possible to tailor the duration 219 of the prolongation 209 such that excessive increase of the power consumption is avoided.

Generally, the duration 219 of the prolongation 209 may not be less than 50% of the duration 211 of the ON time 202 during which the interface 1303 operates in a active state 282, 283 according to the schedule 200. In some examples, the duration 219 may not be less than 200% of the duration 211, optionally lot less than 500%. Thereby, a significant window of opportunity can be open for receiving additional DL data. On the other hand, the duration 211 of the ON time 201 can be configured to be normally short according to the schedule 200, thereby reducing the average power consumption.

On the other hand, the various techniques described herein facilitate configuration of a particularly long OFF time 240. By means of the temporary prolongation 209, a likelihood for receiving the DL payload data 261 within the same repetition 231-233 in which the UL payload data 251 is also transmitted can be increased. Thereby, it is possible to increase the duration 212 of the OFF time 240. For example, the duration 219 of the prolongation 209 may not be more than 10% of the duration 212, optionally not more than 2%, further optionally not more than 0.1%. In absolute terms, the duration 212 may be on the order of minutes, hours or even days. In particular, in the context of IOT applications, this may facilitate reduced power consumption.

In the example of FIG. 8, the temporary deviation is restricted to the single repetition 232. Hence, a fallback to the schedule 200 is implemented no later than in the repetition 233 which is adjacent and subsequent to the repetition 232. By restricting the temporary deviation to a single repetition, the power-consumption optimized schedule 200 can be largely implemented with the exception of those repetitions in which a need for receiving the DL payload data is detected. In other examples, the temporary deviation may also cover more than a single repetition.

Figure 9A:
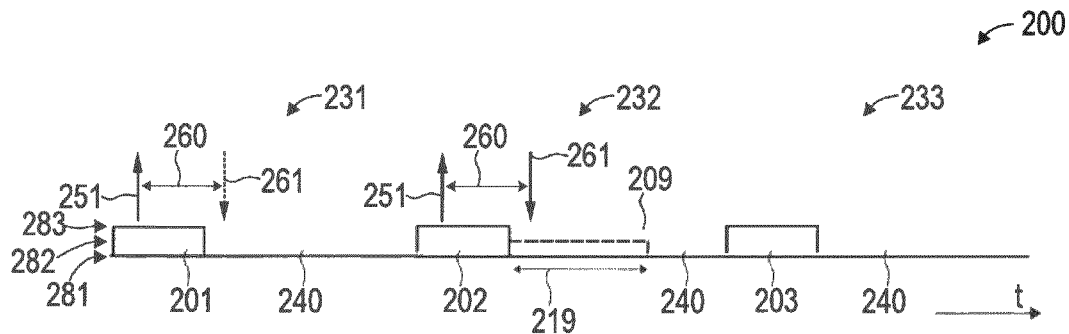
FIG. 9A schematically illustrates a repetitive schedule for switching an interface of the terminal between an active state and a sleep state according to various examples.

FIG. 9A illustrates aspects with respect to a repetitive schedule 200. In particular, FIG. 9A illustrates aspects with respect to implementing a temporary deviation from the schedule 200. The example of FIG. 9A generally corresponds to the example of FIG. 8.

In the example of FIG. 9A, again, in the repetition 232 of the schedule 200, the prolongation 209 as deviation from the schedule 200 is implemented. Here, the interface 1303 operates in the idle state 282 during the prolongation 209. Thus, upon expiry of the ON time 202—in which the interface 1303 operates in the connected state at 283—, the interface 1303 switches the mode of operation and then continues to operate in the idle state 282. This may include releasing the data connection 160 which has been established during the ON time 202 and listening for DL paging signals in the idle state 282. The DL paging signals can then help to trigger another attach procedure 288 once the DL payload data 261 is ready for transmission at the eNB 112 (not illustrated in FIG. 9A for sake of simplicity). By implementing two active states 283, 282 according to the example of FIG. 9A, the power consumption of the terminal 130 can be reduced while still opening a further window of opportunity for receiving the DL payload data 261.

Figure 9B:
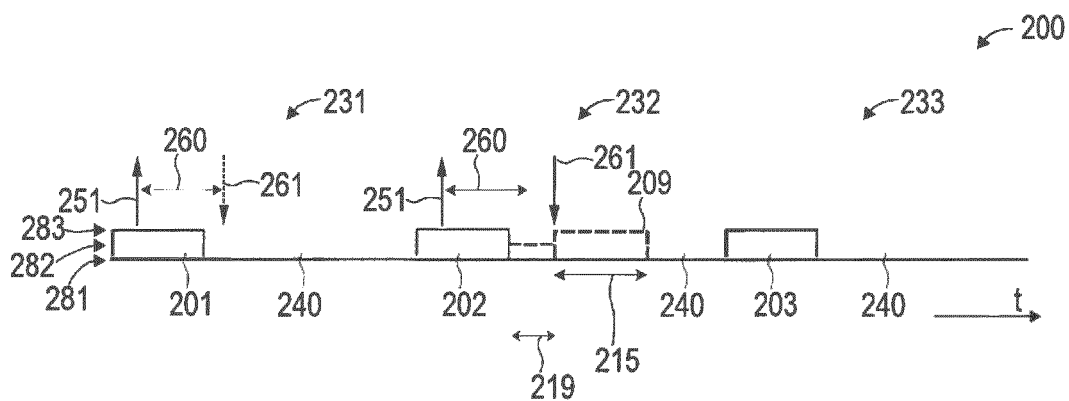
FIG. 9B schematically illustrates a repetitive schedule for switching an interface of the terminal between an active state and a sleep state according to various examples.

FIG. 9B illustrates aspects with respect to a repetitive schedule 200. In particular, FIG. 9B illustrates aspects with respect to implementing a temporary deviation from the schedule 200. The example of FIG. 9B generally corresponds to the example of FIG. 9A. Here, after receiving the downlink payload data 261, the inactivity timer 215 is triggered.

Figure 10:
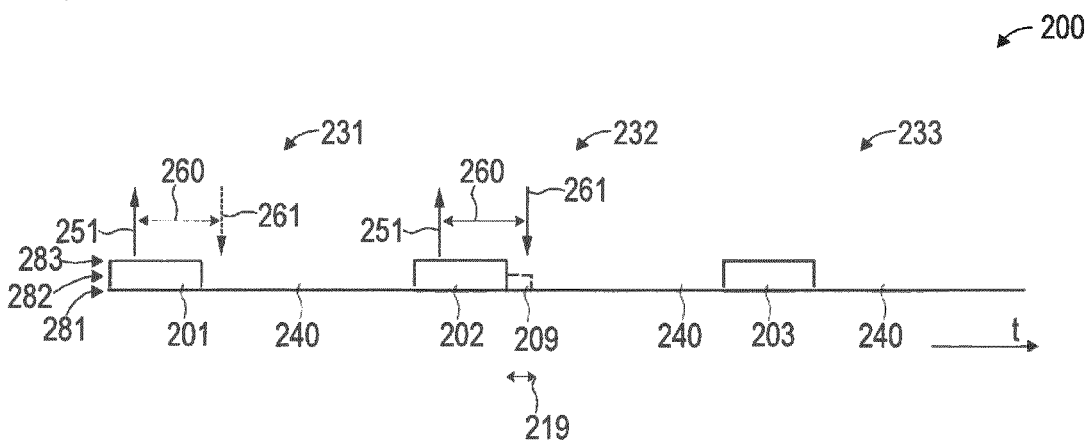
FIG. 10 schematically illustrates a repetitive schedule for switching an interface of the terminal between an active state and a sleep state according to various examples.

FIG. 10 illustrates aspects with respect to a repetitive schedule 200. In particular, FIG. 10 illustrates aspects with respect to implementing a temporary deviation from the schedule 200. The example of FIG. 10 generally corresponds to the example of FIG. 9A.

In the example of FIG. 10, again, in the repetition 232 of the schedule 200, the prolongation 209 as deviation from the schedule 200 is implemented. Here, the interface 1303 operates in the idle state 282 during the prolongation 209. In the example of FIG. 10, a fallback to the schedule 200 is implemented in response to receiving the DL payload data 261. This means that after receiving the DL payload data 261—instead of proceeding to operate in the idle state 282 for a certain duration—, the interface 1303 directly switches back to operating in the sleep state 240. This helps to further reduce the power consumption of the terminal 130. Such a scenario could also be employed for a schedule 200 according to other examples, e.g., the example of FIG. 8.

Figure 11:
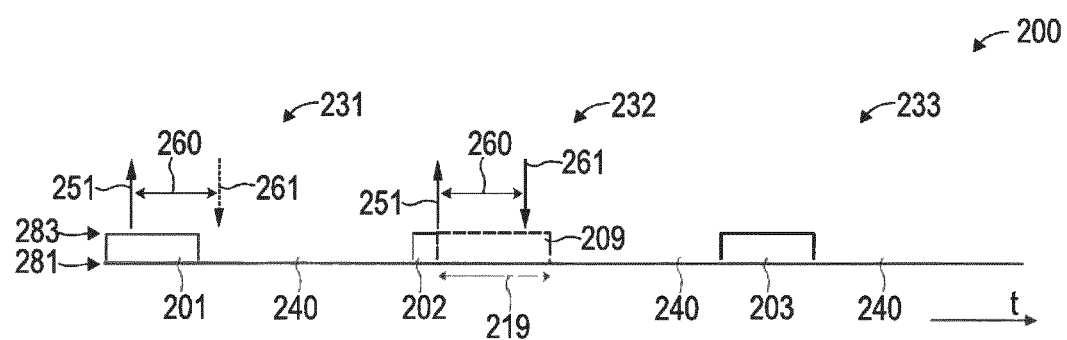
FIG. 11 schematically illustrates a repetitive schedule for switching an interface of the terminal between an active state and a sleep state according to various examples.

FIG. 11 illustrates aspects with respect to a repetitive schedule 200. In particular, FIG. 11 illustrates aspects with respect implementing a temporary deviation from the schedule 200. The example of FIG. 11 generally corresponds to the example of FIG. 8.

In the example of FIG. 11, the prolongation 209 is not triggered by the end of the ON time 202. Rather, a timer is initialized based on the determined duration 219 of the prolongation 209 in response to transmitting the UL payload data 251. Thereby, an accurate measure with respect to the expected round-trip latency 260 can be implemented. Excessive power consumption of the terminal 130 may be avoided.

The various examples described in FIGS. 8-11 can be combined with each other in further examples. For example, the timer techniques of FIG. 11 may be combined with the idle state techniques of FIGS. 9 and 10.

As will be appreciated from the above, it may be possible to implement the techniques of switching between the different states 281-283 according to a DRX cycle, e.g., in the 3GPP LTE framework. Here, connected DRX and/or idle DRX can be used in order to implement the techniques of switching between the different states 281-283. For example, the prolongation 209 may be implemented by temporarily reconfiguring the inactivity timer of DRX. The inactivity timer may specify a time duration during which the interface 1303 is controlled to continue operation in the at least one active state 282, 283 when expecting the DL payload data 261. For example, the inactivity timer may be triggered in response to transmitting UL payload data 251 and/or in response to receiving DL payload data.

Figure 12:
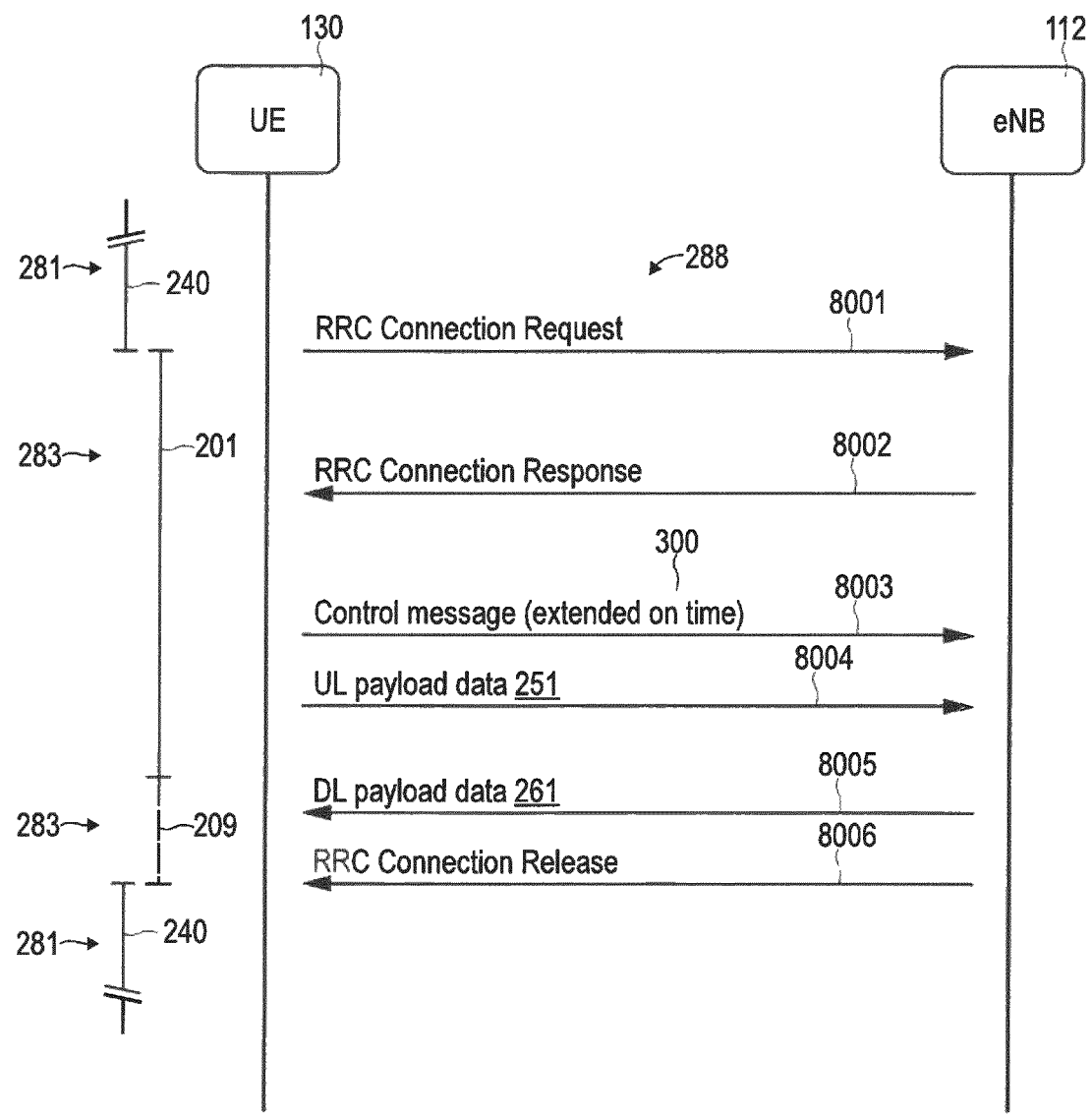
FIG. 12 is a signaling diagram schematically illustrating the communication of UL control data indicative of a temporary deviation from a negotiated repetitive schedule according to various examples.

FIG. 12 is a signaling diagram illustrating aspects with respect to signaling UL control data 300 indicative of a temporary deviation from a repetitive schedule 200. FIG. 12 further illustrates aspects with respect to switching between the different states 281, 283.

Initially, the interface 1303 of the terminal 130 operates in the sleep state 281. Then, according to the schedule 200, the interface 1303 switches to the connected state 283. This includes performing an attach procedure 288 for establishing a DL payload channel and an UL payload channel. The attach procedure 288 may include a Random Access (not illustrated in FIG. 12). The attach procedure 288 also includes the terminal 130 transmitting an RRC Connection Request message 8001. The RRC Connection Request message 8001 seeks to establish an RRC connection such as the data connection 160. Then, the eNB 112 response with the RRC Connection Response message 8002. This facilitates establishing of the data connection 160. As can be seen from FIG. 12, the transition into the connected state 283 involves communicating of RRC layer control messages to configure the connected state 283. Thus, the connected state 283 may be generally defined on the OSI Network layer level.

Next, the terminal 130 transmits a UL control message 8003. The UL control message 8003 includes the UL control data 300. The UL control data 300 is indicative of a temporary prolongation 209 as deviation from the schedule 200 for the active repetition.

The terminal 130 also transmits a message 8004 including the UL payload data 251. Then, in conformity with the UL control data 300, the terminal 130 implements the temporary prolongation 209 of the connected state 283. During the prolongation 209, the terminal 130 receives, from the network 100 and in particular from the eNB 112, a message 8005 which includes the DL payload data 261. The DL payload data 261 and the UL payload data 251 belong to the same service. It is possible that the DL payload data 261 originates from the same server to which the UL payload data 251 is addressed, e.g., on TCP/IP level or Transport layer according to the OSI model.

Then, upon expiry of the prolongation 209, and RRC Connection release message 8006 is transmitted from the network 100 to the terminal 130. The message 8006 facilitates transition 289 into the sleep state 281. The data connection 160 is released. This configures the sleep state 281.

Figure 13:
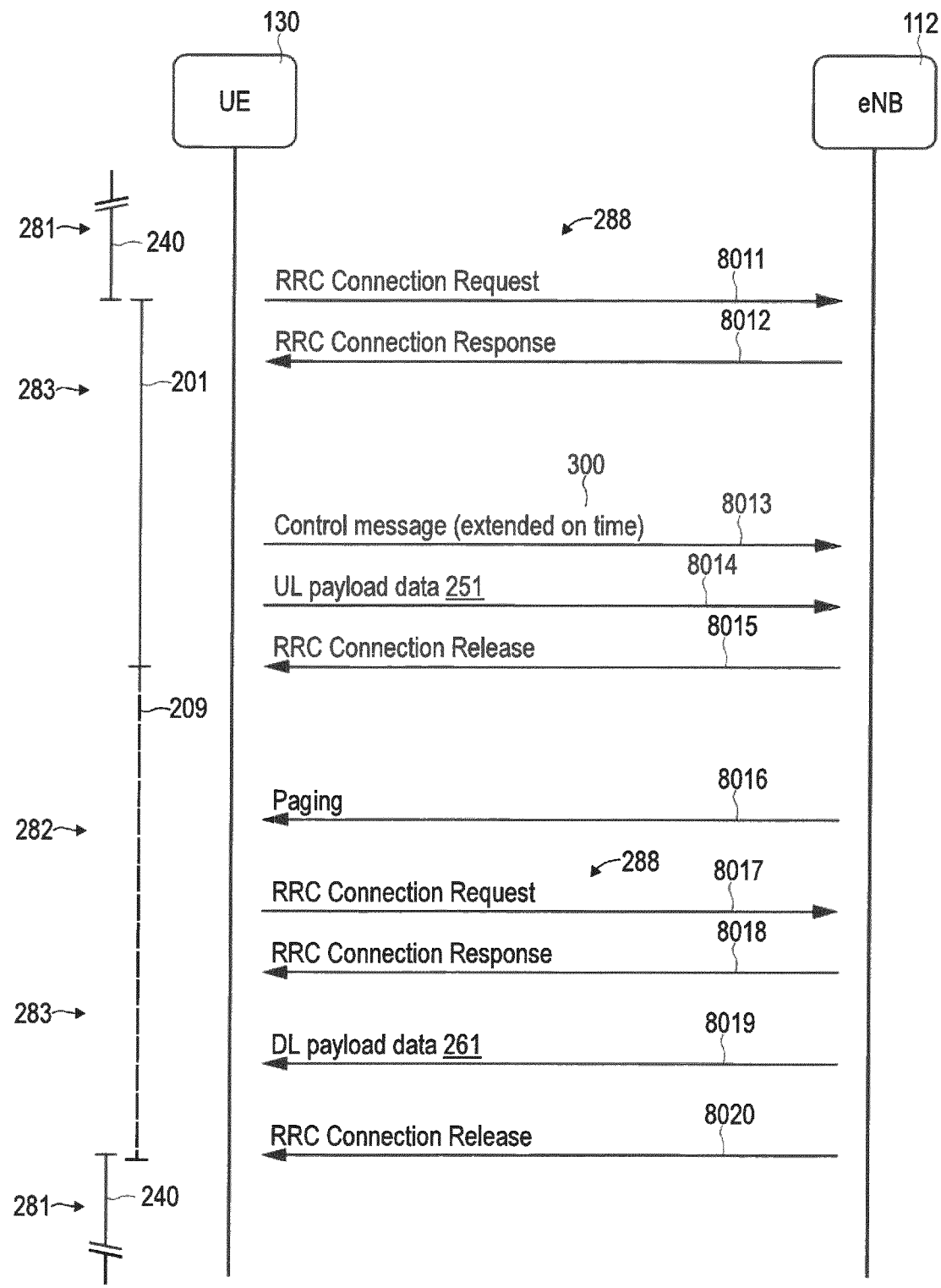
FIG. 13 is a signaling diagram schematically illustrating the communication of UL control data indicative of a temporary deviation from a negotiated repetitive schedule according to various examples.

FIG. 13 is a signaling diagram illustrating aspects with respect to signaling UL control data 300 indicative of a temporary deviation from a repetitive schedule 200. FIG. 13 further illustrates aspects with respect to switching between the different states 281, 282, 283.

8011-8014 generally correspond to 8001-8004. Then, an RRC Connection Release message 8015 is transmitted from the network 100 to the terminal 130. This facilitates transition from the connected state 283 into the idle state 282. In particular, the data connection 160 is released. Then, the terminal 130 receives a DL paging 8016 during the prolongation 209. In response to the receiving of the DL paging 8016, the attach procedure 288 is performed which again includes communication of the RRC Connection Request message 8017 and a RRC Connection Response message 8018. The messages 8017, 8018 facilitate establishment of the data connection 160. Then, via the data connection 160, a message 8019 including the DL payload data 261 can be received.

At the end of the prolongation 209, and RRC Connection Release message 8020 is communicated in order to release the data connection 160 and transition into the sleep state 281.

In the examples of FIGS. 12 and 13, the control data 300 is transmitted as part of a control message 8003, 8013 transmitted after completion of the attach procedure 288. For example, the control messages 8003, 8013 can be dedicated control messages transmitted on a control channel such as the physical UL control channel (PUCCH) in the 3GPP LTE framework. Other examples of transmitting the control data 300 are possible. For example, the control data 300 may be transmitted as part of the attach procedure.

Figure 14:
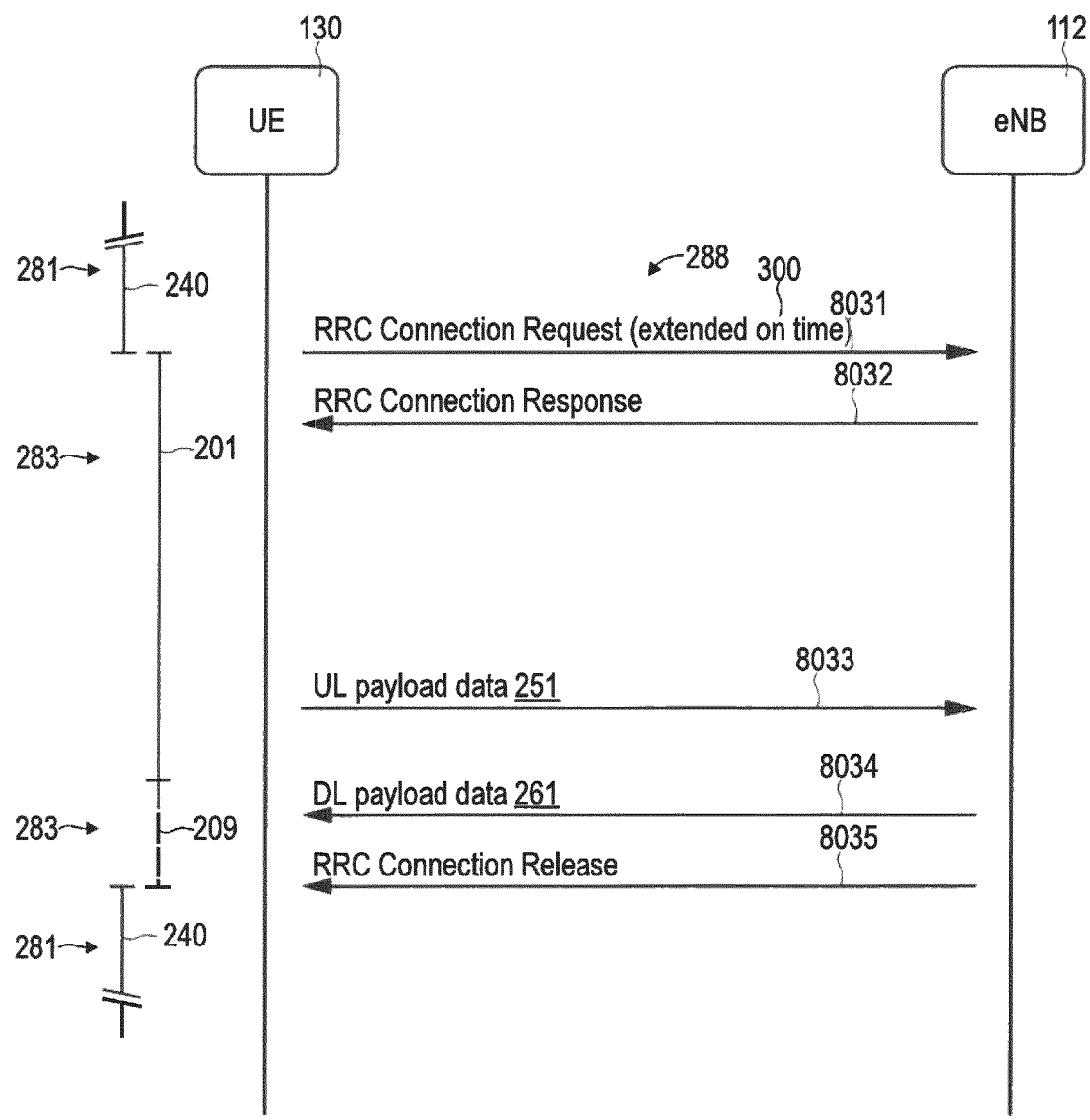
FIG. 14 is a signaling diagram schematically illustrating the communication of UL control data indicative of a temporary deviation from a negotiated repetitive schedule according to various examples.

FIG. 14 is a signaling diagram illustrating aspects with respect to signaling UL control data 300 indicative of a temporary deviation from a repetitive schedule 200. FIG. 14 further illustrates aspects with respect to switching between the different states 281, 283. FIG. 14 further illustrates aspects with respect to piggybacking the UL control data onto a control message.

The example of FIG. 14 generally corresponds to the example of FIG. 12. However, in the example of FIG. 14, the control data 300 indicative of the deviation from the schedule 200, in particular indicative of the prolongation 200, is piggybacked onto the RRC Connection Request message 8031 communicated during the attach procedure 288. It would also be possible that the control data 300 is piggybacked onto a different control message communicated the attach procedure 288. Thus, according to the example of FIG. 14, the UL control data 300 is transmitted during the attach procedure 288. This helps to inform the network 100 with sufficiently time of the prolongation 209. Further, control signaling overhead may be reduced. The example of FIG. 14 may be combined, e.g, with the example of FIG. 13, etc.

8032-8035 generally correspond to 8002, 8004-8006.

Generally, the control data 300 may be a single bit information field. Then, the deviation from the schedule 200 can be implemented according to predefined rules. In further examples, it would also be possible that the control data 300 includes multi-bit information. For example, the control data 300 may be indicative of a duration of the temporary deviation, e.g., indicative of the duration 219 of the prolongation 209. Then, the terminal 130 may flexibly decide— e.g., based on the anticipated power consumption and/or the round-trip latency of the service associated with the payload data 251, 261—what duration of the temporary deviation is appropriate in the given circumstances. In other examples, it may also be possible that the duration of the temporary deviation is network-defined. For example, corresponding logic may reside in the eNB 112. In such a scenario, it may be possible to consider further factors such as transmission collision between multiple terminals etc. For example, the UL control data 300 may be indicative of the service. Then, the network 100 may have additional a-priori knowledge on the typical round-trip latency associated with that service. For example, the eNB 112 may monitor the round-trip latency. Further, the network may take into consideration scheduling constraints for transmitting the DL payload data 261. This may increase an accuracy of dimensioning the duration of the temporary deviation. For example, DL control data may be transmitted from the network 100 to the terminal 130, the DL control data being indicative of a duration of the temporary deviation from the schedule 200 (not shown in FIG. 14), e.g., in multiples of a default duration.

By means of the control data 300, the network 100 is made aware of the deviation from the schedule 200. Then, the eNB 112 may transmit the DL payload data 261 according to the deviation in order to facilitate timely reception thereof.

Figure 15:
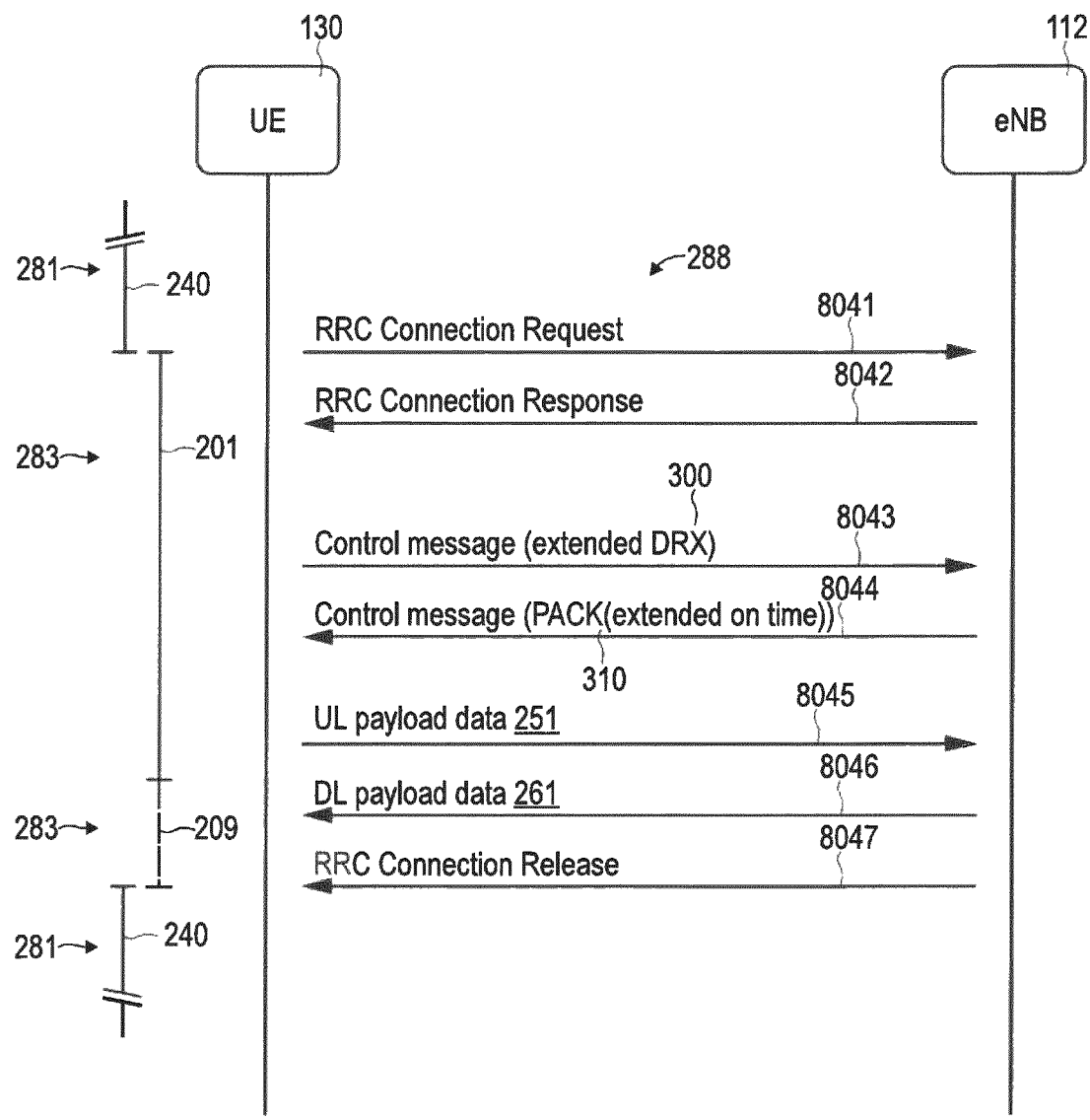
FIG. 15 is a signaling diagram schematically illustrating the communication of UL control data indicative of a temporary deviation from a negotiated repetitive schedule according to various examples.

FIG. 15 is a signaling diagram illustrating aspects with respect to signaling UL control data 300 indicative of a temporary deviation from a repetitive schedule 200. FIG. 15 further illustrates aspects with respect to switching between the different states 281, 283. FIG. 15 further illustrates aspects with respect to communicating a downlink acknowledgement from the network 100 to the terminal 130.

The example of FIG. 15 generally corresponds to the example of FIG. 12. For example, 8041-8043 correspond to 8001-8003. In the example of FIG. 15, the network 100 sends a DL control message 8044. The control message 8044 is indicative of an acknowledgment 310 of the UL control data 300 which has been previously communicated as part of the control message 8043.

In the example of FIG. 15, the network 100 positively acknowledges the temporary prolongation 209 as deviation from the schedule 200, i.e., sends a positive acknowledgement (PACK) sometimes the PACK is simply referred to as ACK. Because of this acknowledgment 310, the terminal 130 proceeds and implements the prolongation 209. For example, if a negative acknowledgment (NACK) was received by the terminal 130 (not illustrated in FIG. 15), the terminal 130 could continue according to the predefined schedule 200, i.e., skipping the prolongation 209.

Generally, a transmission of an acknowledgment is not mandatory. The transmission of an acknowledgment by the network is optionally. For example, if a technique without explicit downlink control signaling is implemented, it would be possible to implicitly acknowledge the request of the terminal. Acknowledgement techniques may also be employed in the other examples described herein, e.g., in the examples of FIGS. 12-14.

For example, in response to transmitting the UL control data, the terminal 130 may receive an acknowledgment. It would be possible that the UL control data is not indicative of a duration of the prolongation 209. Then, the predefined value for the duration of the prolongation 209 could be used. For example, such a predefined value could use a standardized multiple of a preconfigured default timer value. For example, it would also be possible that the UL control data is indicative of the duration of the prolongation 209. Then, if the acknowledgment positively acknowledges such a request made by the terminal 130, the indicated duration of the prolongation 209 may be used. However, if the acknowledgment negatively acknowledges such a request made by the terminal 130, a default value can be used for the duration 219 of the prolongation 209.

In further examples, the DL control data can include the acknowledgment and possibly a response parameter. For example, the terminal receives a positive acknowledgment including a response parameter, this parameter may define the duration 219 of the prolongation 209, e.g., as a multiplier of an earlier configured default value. For example, the terminal receives a negative acknowledgment, a default value can be used.

8045-8047 then correspond to 8004-8006.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

While above various examples have been described with respect to Network layer-defined states of the interface, similar examples may be also employed with respect to states of the interface that are defined on the layers such as the physical layer (layer 1) and/or the data link layer (layer 2).

While above various examples have been described with respect to a temporary prolongation, similar techniques could also be applied with respect to other kinds of temporary deviations from the negotiated schedule, e.g., temporary shortenings of the at least one active state or temporary extensions of the duration of the repetition, etc.

While above various examples have been described with respect to a periodic schedule, respective techniques may be readily applied for an event-triggered schedule. For example, an ON-time may be triggered in response to a need of transmitting UL data.

For example, while various examples have been described with respect to an inactivity timer which is triggered upon reception of DL data, similar techniques may be readily implemented when triggering the inactivity timer alternatively or additionally upon transmission of UL data.

The invention claimed is:

1. A terminal, comprising:
an interface configured to communicate with a network on a wireless link, and
at least one processor configured to control the interface to switch between at least one active state and a sleep state according to a schedule, the at least one active state comprising a connected state where the terminal maintains a data connection on a wireless link with the network, the data connection being released during the sleep state,
wherein the at least one processor is configured to transmit uplink control data to the network indicative of a temporary prolongation of the at least one active state, the uplink control data being piqqybacked onto a control message communicated during a procedure for establishing the data connection.

2. The terminal of claim 1,
wherein the schedule is repetitive,
wherein the at least one processor is configured to transmit the uplink control data in a given repetition of the schedule, the uplink control data being indicative of the prolongation of the at least one active state in the given repetition.

3. The terminal of claim 2,
wherein the at least one processor is configured to transmit, via the interface, uplink payload data of a service in the given repetition of the schedule,
wherein the at least one processor is configured to receive, via the interface, downlink payload data of the service in the given repetition of the schedule and during the prolongation,
wherein the at least one processor is configured to determine a duration of the prolongation based on knowledge on a roundtrip latency of the service.

4. The terminal of claim 3,
wherein the at least one processor is configured to receive, via the interface, a downlink paging signal in the given repetition of the schedule and during the prolongation,
wherein the at least one processor is configured to perform an attach procedure for establishing a data connection on the wireless link in response to said receiving of the downlink paging signal,
wherein the at least one processor is configured to receive the downlink payload data on the data connection.

5. The terminal of claim 3,
wherein the at least one processor is configured to initialize a timer based on the determined duration of the prolongation and in response to transmitting the uplink payload data.

6. The terminal of claim 3,
wherein the at least one processor is configured to fall back to the schedule in response to receiving the downlink payload data.

7. The terminal of claim 2,
wherein the at least one processor is configured to control the interface to operate in a connected state selected from the at least one active state in the given repetition and prior to the prolongation, the interface being configured to maintain a data connection of the wireless link in the connected state,
wherein the at least one processor is configured to control the interface to operate in an idle state selected from the at least one active state in the given repetition of the schedule during the prolongation, the interface being configured to release the data connection and to listen for downlink paging signal in the idle state.

8. The terminal of claim 2,
wherein a duration of the prolongation is not less than 50% of a duration of the at least one active state according to the schedule, optionally not less than 200%, further optionally not less than 500%, and/or
wherein the duration of the prolongation is a fraction of the duration of the sleep state.

9. The terminal of claim 1,
wherein the schedule implements a Discontinuous Reception (DRX) cycle,
wherein the prolongation is implemented by temporarily reconfiguring an inactivity timer of the DRX cycle, the inactivity timer defining a time duration during which the interface is controlled to continue operation in the at least one active state when expecting downlink payload data.

10. The terminal of claim 1,
wherein the uplink control data is indicative of a duration of the temporary prolongation.

11. The terminal of claim 1,
wherein the at least one processor is configured to receive downlink control data indicative of an acknowledgement of the uplink control data,
wherein the at least one processor is configured to selectively implement the temporary prolongation based on the acknowledgement.

12. The terminal of claim 11,
wherein the downlink control data is further indicative of a duration of the temporary prolongation.

13. The terminal of claim 1,
wherein the schedule is repetitive,
wherein the at least one processor is configured to implement the temporary prolongation in a first repetition of the schedule,
wherein the at least one processor is configured to fall back to the schedule no later than in a second repetition of the schedule, the second repetition being adjacent and subsequent to the first repetition.

14. The terminal of claim 1,
wherein the at least one processor is configured to selectively trigger the temporary prolongation in response to a need for receiving downlink payload data of a service,
wherein the at least one processor is configured to receive the downlink payload data during the prolongation.

15. The terminal of claim 1,
wherein the schedule is negotiated with network or is predefined.

16. A system, comprising:
a network node having at least one processor, and
a terminal according to claim 1.

17. A network node of a network, comprising:
at least one processor configured to receive uplink control data from a terminal indicative of a temporary prolongation of at least one active state of a schedule for switching an interface of the terminal between at least one active state and a sleep state,
wherein the at least one active state comprises a connected state where the terminal maintains a data connection on a wireless link with the network, the data connection being released during the sleep state, and
the uplink control data being piggybacked onto a control message communicated during a procedure for establishing the data connection.

18. A method, comprising:
controlling an interface of a terminal connected to a network to switch between at least one active state and a sleep state according to a schedule, the at least one active state comprising a connected state where the terminal maintains a data connection on a wireless link with the network, the data connection being released during the sleep state, and
transmitting, to the network, uplink control data indicative of a temporary prolongation of the at least one active state, the uplink control data being piggybacked onto a control message communicated during a procedure for establishing the data connection.

19. A method, comprising:
receiving uplink control data from a terminal, the uplink control data being indicative of a temporary prolongation of at least one active state of a schedule for switching an interface of the terminal between at least one active state and a sleep state,
wherein the at least one active state comprises a connected state where the terminal maintains a data connection on a wireless link with the network, the data connection being released during the sleep state, and
the uplink control data being piggybacked onto a control message communicated during a procedure for establishing the data connection.

* * * * *